US009033082B2

(12) United States Patent
Matsumoto et al.

(10) Patent No.: US 9,033,082 B2
(45) Date of Patent: May 19, 2015

(54) FUEL CELL APPARATUS FOR VEHICLES

(71) Applicant: Suzuki Motor Corporation, Shizuoka (JP)

(72) Inventors: Shiro Matsumoto, Shizuoka (JP); Naoki Ozawa, Shizuoka (JP); Kenji Kobayashi, Shizuoka (JP)

(73) Assignee: Suzuki Motor Corporation, Shizuoka (JP)

( * ) Notice: Subject to any disclaimer, the term of this patent is extended or adjusted under 35 U.S.C. 154(b) by 0 days.

(21) Appl. No.: 13/904,104

(22) Filed: May 29, 2013

(65) Prior Publication Data
US 2013/0333964 A1      Dec. 19, 2013

(30) Foreign Application Priority Data

Jun. 13, 2012   (JP) ................... 2012-134179

(51) Int. Cl.
*B60K 11/06*      (2006.01)
*B60K 13/02*      (2006.01)
*H01M 8/04*       (2006.01)
*B60L 11/18*      (2006.01)
*H01M 8/24*       (2006.01)

(52) U.S. Cl.
CPC ....... *H01M 8/04201* (2013.01); *B60L 11/1896* (2013.01); *H01M 8/2465* (2013.01); *Y02E 60/50* (2013.01); *Y02E 60/521* (2013.01); *B60L 11/1892* (2013.01); *B60L 2240/545* (2013.01); *B60L 2240/54* (2013.01)

(58) Field of Classification Search
USPC .................. 180/65.31, 68.1, 68.2, 68.3, 68.4; 429/458, 459
See application file for complete search history.

(56) References Cited

U.S. PATENT DOCUMENTS

| | | | | |
|---|---|---|---|---|
| 4,186,817 A | * | 2/1980 | Bauer | 180/68.1 |
| 4,651,816 A | * | 3/1987 | Struss et al. | 165/76 |
| 5,046,550 A | * | 9/1991 | Boll et al. | 165/41 |
| 6,626,483 B2 | * | 9/2003 | Ozawa et al. | 296/193.09 |
| 6,907,916 B2 | * | 6/2005 | Koyama | 165/67 |
| 7,438,348 B2 | * | 10/2008 | Nakamae et al. | 296/187.04 |
| 7,479,339 B2 | * | 1/2009 | Okazaki | 429/415 |

(Continued)

FOREIGN PATENT DOCUMENTS

| | | |
|---|---|---|
| DE | 10 2008 038 083 A1 | 4/2009 |
| GB | 2494078 A | 2/2013 |

(Continued)

OTHER PUBLICATIONS

Combined Search and Examination Report under Sections 17 and 18(3) mailed Nov. 22, 2013 in GB1309632.6 (5 pages).

*Primary Examiner* — Frank Vanaman
(74) *Attorney, Agent, or Firm* — Rothwell, Figg, Ernst & Manbeck, P.C.

(57) ABSTRACT

Fuel cell stacks 3 are arranged in a vehicle-transverse juxtaposition with a radiator 107 disposed in an engine room 104 vehicle-longitudinally rearward of a front member 108, and an air suction duct 2 introducing air to air in-taking aperture areas 31 of the fuel cell stacks 3 vehicle-longitudinally extends from the air in-taking aperture areas 31 up to the front member 108, having an upper air in-taking port 212A and a lower air in-taking port 212B vehicle-longitudinally frontward of the radiator 107 and opened toward a set of upper grill openings 110 and a set of lower grill openings 111, respectively.

8 Claims, 8 Drawing Sheets

(56) References Cited

U.S. PATENT DOCUMENTS

2005/0170225 A1  8/2005  Okazaki
2010/0243351 A1*  9/2010  Sakai ........................ 180/68.1

FOREIGN PATENT DOCUMENTS

| JP | 2005-216777 A | 8/2005 |
|---|---|---|
| JP | 2007-1503 A | 1/2007 |

* cited by examiner

FUEL CELL APPARATUS FOR VEHICLES

CROSS-REFERENCE TO RELATED APPLICATION

This application is based upon and claims the benefit of priority from Japanese Patent Application No. 2012-134179, filed Jun. 13, 2012, the entire contents of which are incorporated herein by reference.

BACKGROUND OF INVENTION

1. Technical Field

The present invention relates to a fuel cell apparatus for vehicles, and particularly, to a fuel cell apparatus for vehicles using air as a reaction gas and a coolant.

2. Relevant Art

Fuel cell stacks can keep a stable operational performance, when held within an adequate temperature range. For instance, in fuel cell vehicles equipped with an air-cooled fuel cell stack, the fuel cell stack tends to have increased temperatures in environments involving high temperatures of outside air. Then, the fuel cell stack may have excessively increased temperatures exceeding a prescribed temperature, with anxieties about degraded operational performances of the fuel cell stack. In such situations, the fuel cell stack needs to be cooled with as much natural ventilation air streams (sometimes referred simply to as air streams) suctioned into an air suction duct to supply to the fuel cell stack, as possible. It is noted that the term 'natural ventilation air streams' refers to flows or streams of outside air about a vehicle, whether the vehicle is running or not.

In such fuel cell vehicles, the fuel cell stack tends to have decreased temperatures in environments involving low temperatures of outside air. Then, the fuel cell stack may have excessively decreased temperatures falling below a prescribed temperature, with anxieties about degraded operational performances of the fuel cell stack. In such situations, the fuel cell stack needs to be warmed to raise such temperatures, as necessary

SUMMARY OF INVENTION

Fuel cell stacks are made as a combination of a set of one or more unit stacks, and a stack casing constituting an outer cover of the unit stack set. Each unit stack is composed of multi-layered fuel cells, and a fuel cell enclosure integrally enclosing the fuel cells. For necessary air conduction, the fuel cell enclosure has an air introducing aperture for introducing air to internal air supply channels, and an air out-leading aperture for leading out air from air discharge channels communicating with the air supply channels. At each fuel cell stack, the stack casing has 'communication aperture areas' (referred herein sometimes simply to as 'aperture areas') communicating with apertures formed in fuel cell enclosures of the one or more unit stacks, as necessary.

Air-cooled fuel cell stacks have implements such as those using e.g. open-close type flaps for blocking natural ventilation air streams, as needed to provide countermeasures against an over-cooling due to natural ventilation air streams.

Even among those vehicles equipped with existing gasoline-using internal combustion engines, there is known a vehicle including a movable grill shutter device installed in front of a radiator, to shut off streams of air running to flow into an engine room (refer to Japanese Patent Application Laying Open Publication JP 2007-1503 A). Moreover, there is known such a cooling structure for air-cooled fuel cells using natural ventilation air streams that includes an air flow distributing structure and fuel cell stacks installed in an engine room (refer to Japanese Patent Application Laying Open Publication JP 2005-216777 A).

There might be an air-cooled fuel cell apparatus combined with the movable grill shutter device disclosed in the Publication JP 2007-1503 A. However, this combination would have natural ventilation air streams passing the radiator, thus being heated, failing to effectively cool a fuel cell stack.

On the other hand, the cooling structure for air-cooled fuel cells disclosed in the Publication JP 2005-216777 A is complicated in configuration as well as the system, as an issue. Moreover, this cooling structure involves an anxiety about warmed air in the engine room being suctioned to the fuel cell stacks with a lowered cooling effect.

The present invention has been devised in view of such issues. It therefore is an object of the present invention to provide a fuel cell apparatus for vehicles allowing for an enhanced operational performance of a fuel cell stack.

To achieve the object descried, according to an aspect of the present invention, there is provided a fuel cell apparatus for vehicles including a vehicle-transversely extending front bumper disposed at a vehicular front end, the front bumper having a grill opening set formed therein to take in air toward an engine room, a vehicle-transversely extending front member disposed vehicle-longitudinally rearward of the front bumper, close to the front bumper, in a position thereof vehicle-longitudinally non-overlapping the grill opening set, and a radiator disposed in the engine room vehicle-longitudinally rearward of the front member. The fuel cell apparatus for vehicles includes a fuel cell stack and an air suction duct. The fuel cell stack is made up to take in air as a reaction gas and a coolant through an air in-taking aperture area to an inside thereof and discharge air through an air discharging aperture area to an outside thereof, The fuel cell stack is arranged in a vehicle-transverse juxtaposition with the radiator in the engine room vehicle-longitudinally rearward of the front member. The air suction duct is made up to introduce air to the air in-taking aperture area of the fuel cell stack. The air suction duct vehicle-longitudinally extends between the air in-taking aperture area and the front member, having an air in-taking port set of the air suction duct vehicle-longitudinally frontward of the radiator and opened toward the grill opening set.

DETAILED DESCRIPTION OF EMBODIMENTS

There will be described a fuel cell apparatus for vehicles (referred herein sometimes simply to as a fuel cell apparatus)

according to a respective embodiment of the present invention, into details, with reference to the drawings.

It is noted that the drawings are illustrative, including differences from practices, such as those in magnitudes or proportions of dimensions or shapes. Drawings may include also differences in between such as those in ratios or relations of dimensions or shapes. It also is noted that drawings have coordinate systems defined by arrows as legends to identify vehicle longitudinal directions, transverse directions, and vertical directions, for the convenience in description.

First Embodiment

Figure 1:
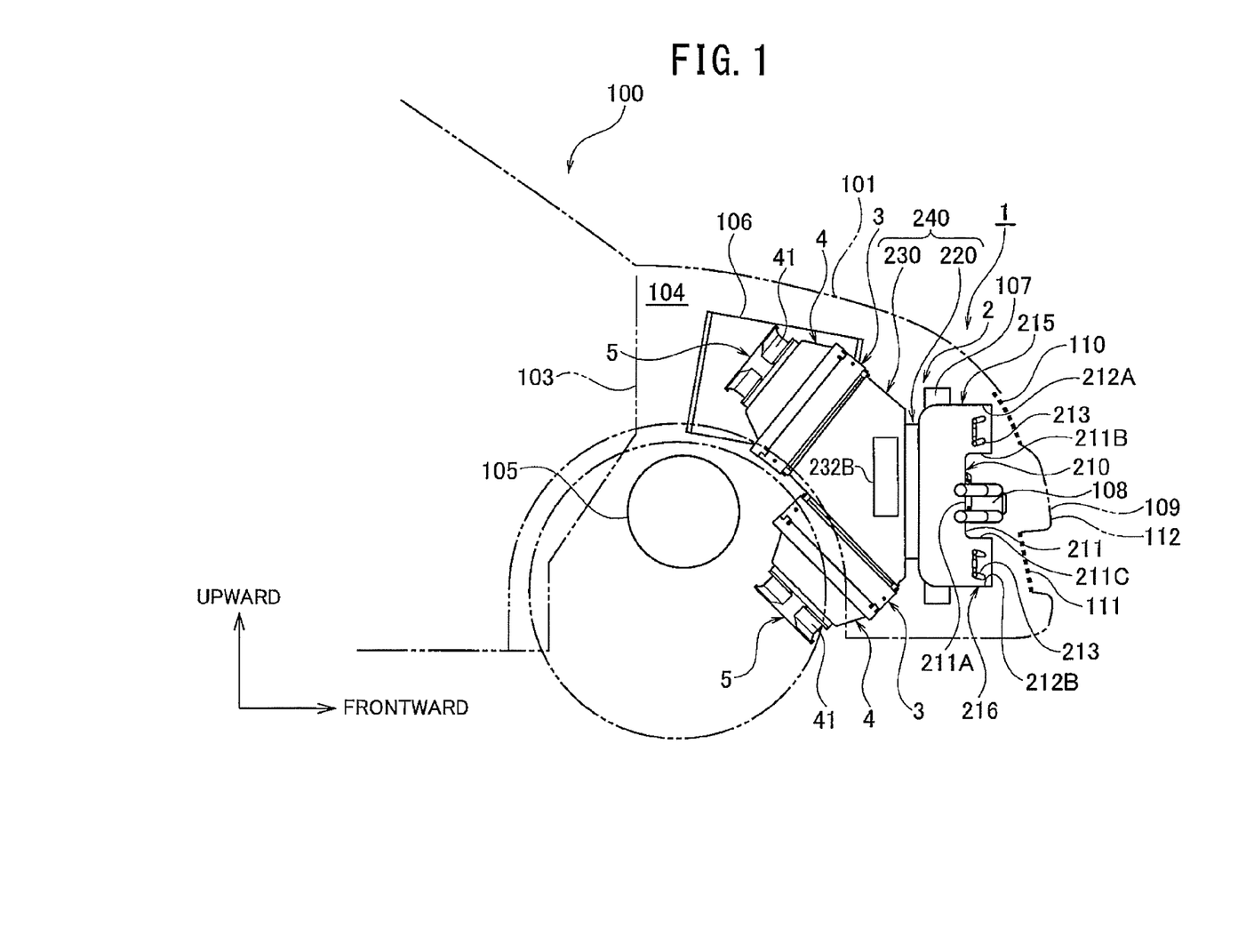
FIG. 1 is a side elevation of a front section of a vehicle including a fuel cell apparatus according to a first embodiment of the present invention.
Figure 2:
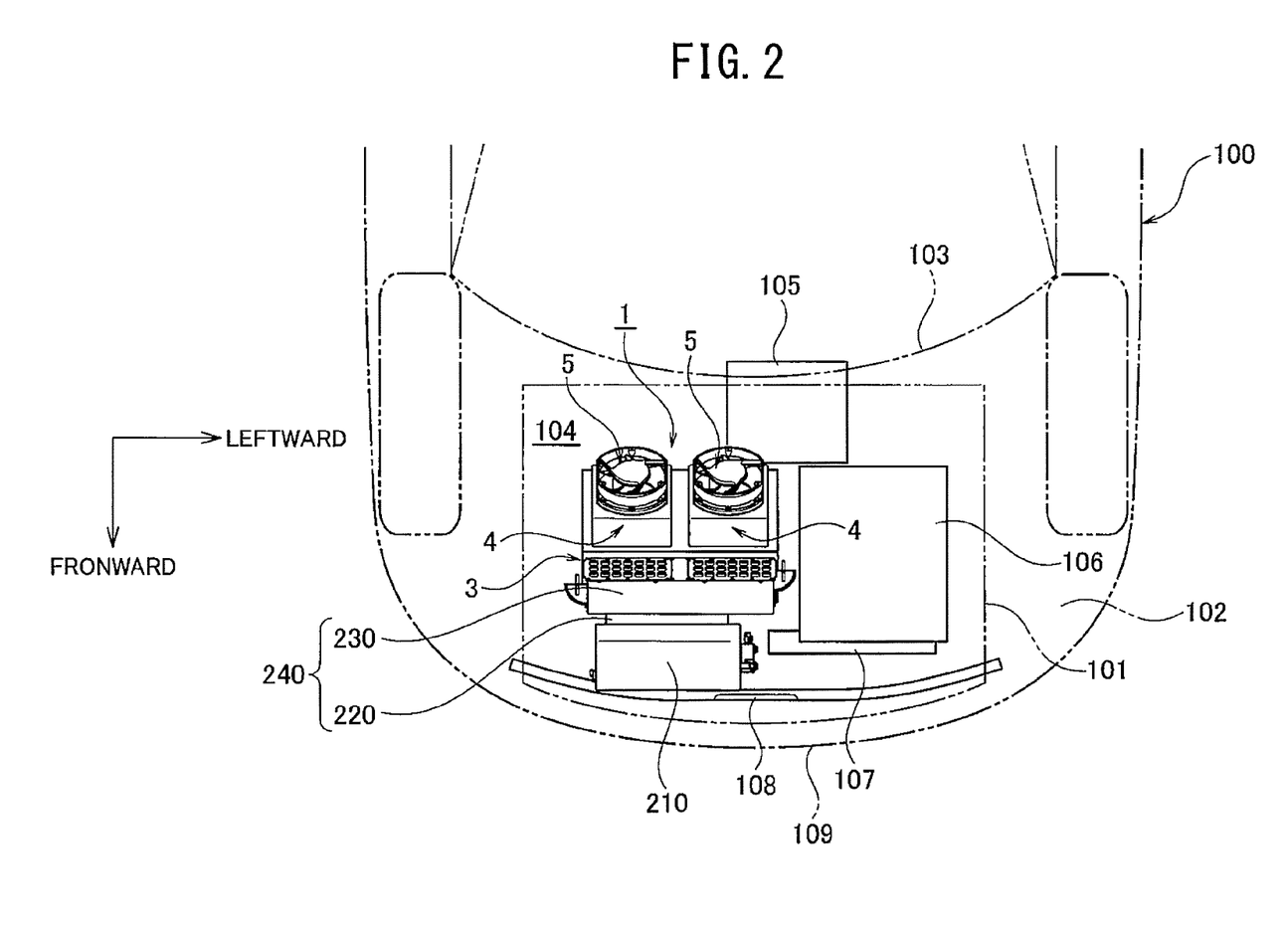
FIG. 2 is a plan view of the vehicle front section.

FIG. 1 and FIG. 2 show, in a side elevation and a plan view, respectively, a front section of a vehicle 100 including a fuel cell apparatus 1 according to a first embodiment of the present invention. The vehicular front section includes an engine room 104 defined by a set of vehicular panels including chassis panels, where the fuel cell apparatus 1 is furnished.

(Vehicular Configuration)

As shown in FIG. 1 and FIG. 2, the set of vehicular panels defining the engine room 104 includes an engine hood 101, side panels 102, and a dash panel 103. The front section of the vehicle 100 including the engine room 104 is provided with a driving motor 105 for traction, an inverter 106, a radiator 107, and a vehicle-transversely extending front member 108, in addition to the fuel cell apparatus 1.

The vehicle 100 has a vehicle-transversely extending front bumper 109 disposed at a vehicular front end thereof. The front bumper 109 has a set of grill openings formed therein to take in air toward the engine room 104. This grill opening set is composed of a set of upper grill openings 110 disposed vehicle-vertically upward of the front member 108, and a set of lower grill openings 111 disposed vehicle-vertically downward of the front member 108, with an un-grilled or blind central bar zone 112 of the front bumper 109 interposed in between. The upper grill opening set 110 and the lower grill opening set 111 are contoured in vehicle-transversely elongate rectangular shapes, respectively.

It is noted that the radiator 107 is disposed in the engine room 104 vehicle-longitudinally rearward of the front member 108 in the engine room 104. The front member 108 is disposed vehicle-longitudinally rearward of the central bar zone 112 of the front bumper 109, close to the front bumper 109, in a position thereof vehicle-longitudinally non-overlapping the grill opening set.

(Fuel cell apparatus)

As shown in FIG. 1 and FIG. 2, the fuel cell apparatus 1 is arranged in a vehicle transverse juxtaposition with the radiator 107, vehicle-longitudinally rearward of the front member 108 in the engine room. The fuel cell apparatus 1 includes an air suction duct 2, a pair of fuel cell stacks 3, two pairs of air discharge ducts 4 arranged either pair for one fuel cell stack 3, and air discharge fans 5 each respectively arranged for any one of air discharge ducts 4.

(Air suction duct)

As shown in FIG. 1, the air suction duct 2 includes an upstream duct portion 210, and a downstream duct portion 240 communicating with the upstream duct portion 210, at their insides. The downstream duct portion 240 extends from air in-taking aperture areas 31 (refer to FIG. 6) of the fuel cell stacks 3 toward the front member 108. The downstream duct portion 240 is composed of a downstream first duct part 220 and a downstream second duct part 230.

Figure 3:
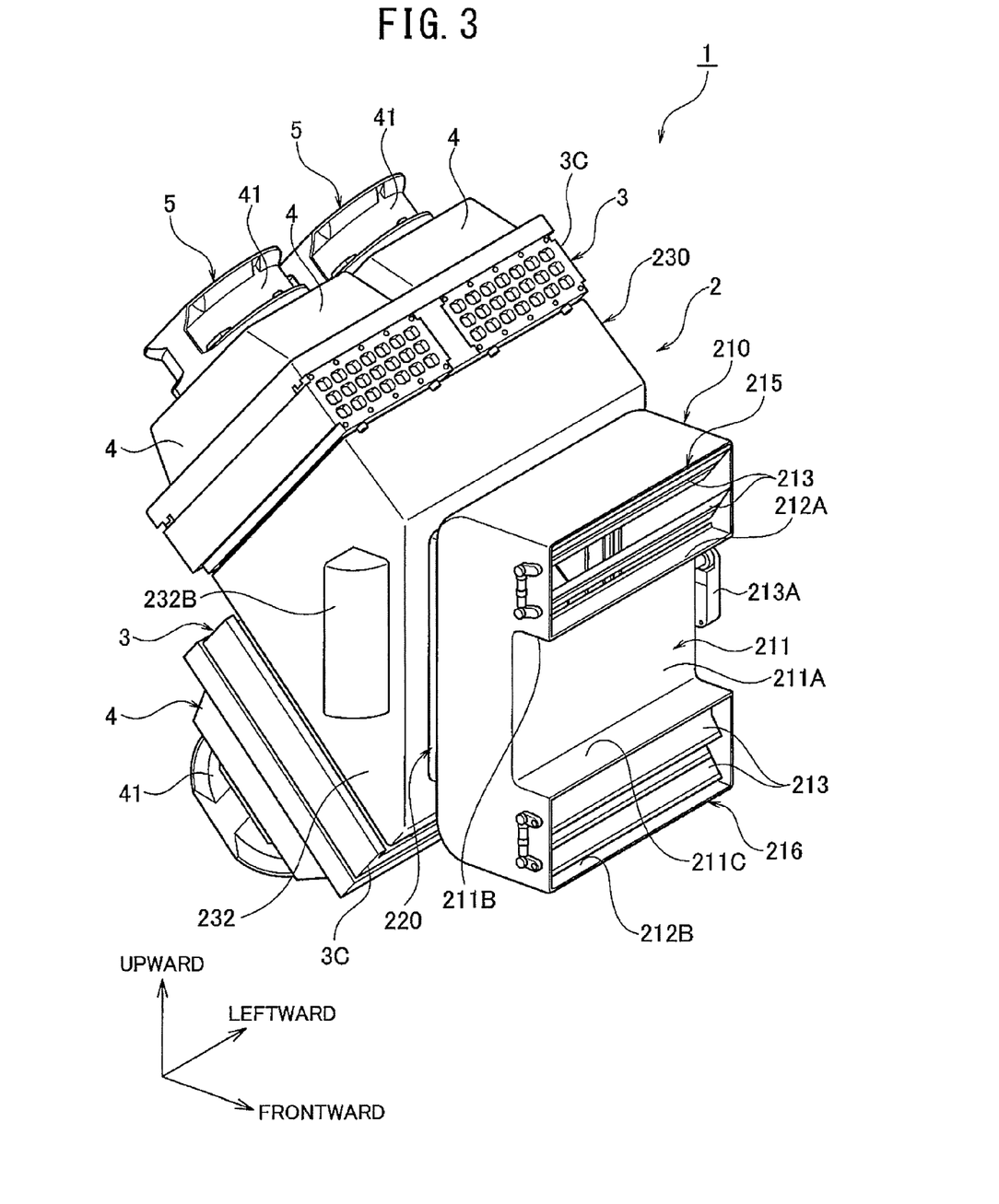
FIG. 3 is a three-quarter view of the fuel cell apparatus.

As shown in FIG. 3, the upstream duct portion 210 is made up with a rectangular tubular casing outlined substantially in a C-form in the side elevation and relatively short in the axial (i.e., vehicle-longitudinal) length. The upstream duct portion 210 is vehicle-vertically bifurcated from a front end of the downstream duct portion 240, that is, a front end of the downstream first duct part 220. The upstream duct portion 210 has, at a vehicle-longitudinally front side thereof, a combination of an upper air intake section 215 and a lower air intake section 216 provided as vehicle-longitudinally frontward protruding upper and lower parts thereof, respectively.

As shown in FIG. 1, the upstream duct portion 210 has, at a vehicle-longitudinally front side thereof, a front side panel 211 extending between the upper air intake section 215 and the lower air intake section 216, with both partially inclusive. The front side panel 211 includes an intermediate part 211A, an upper edge part 211B, and a lower edge part 211C. The intermediate part 211A vehicle-vertically extends, constituting an intermediate region of the front side panel 211. The upper edge part 211B vehicle-longitudinally frontward extends from a round corner at an upper edge of the intermediate part 211A. The lower edge part 211C vehicle-longitudinally frontward extends from a round corner at a lower edge of the intermediate part 211A. Accordingly, the upper edge part 211B of the front panel 211 constitutes a downside of the upper air intake section 215, and the lower edge part 211C of the front panel 211 constitutes an upside of the lower air intake section 216.

Figure 4:
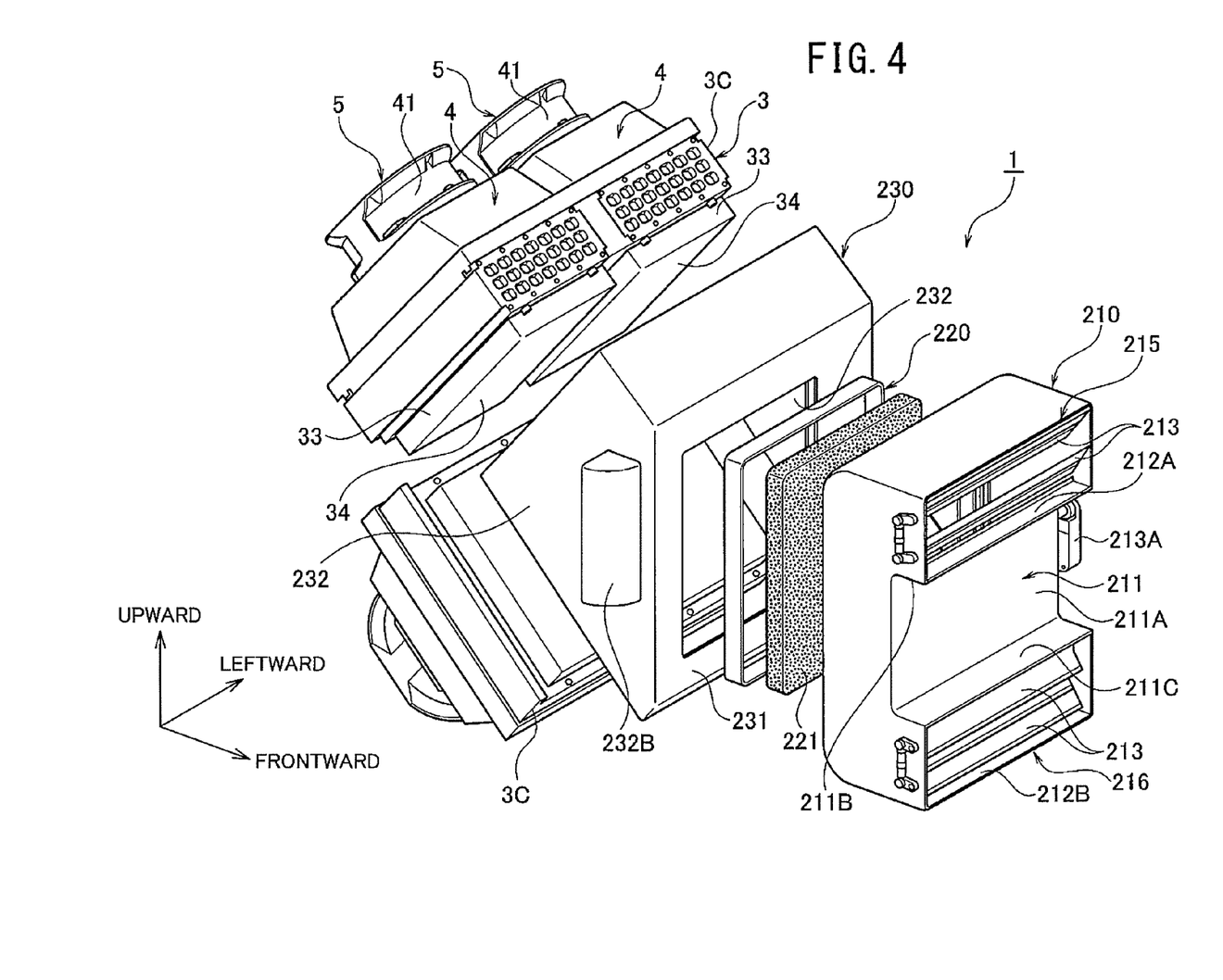
FIG. 4 is an exploded three-quarter view of the fuel cell apparatus.

As shown in FIG. 1, FIG. 3, and FIG. 4, the upper air intake section 215 has an upper air intake port 212A formed at a front end thereof, and the lower air intake section 216 has a lower air intake port 212B formed at a front end thereof. The upper air intake port 212A is opened opposite to the upper grill opening set 110 at a vehicle-vertically upper side of the front member 108. The lower air intake port 212B is opened opposite to the lower grill opening set 111 at a vehicle-vertically lower side of the front member 108. As shown in FIG. 3 and FIG. 4, there are movable flaps 213 provided at or in the upper air intake port 212A and the lower air intake port 212B, respectively. The movable flaps 213 are rotatable by driving with a flap driver 213A, whereby they are adapted for their operations to open or close the upper air intake port 212A and the lower air intake port 212B, as necessary, based on a temperature of outdoor air or each fuel cell stack 3.

Figure 6:
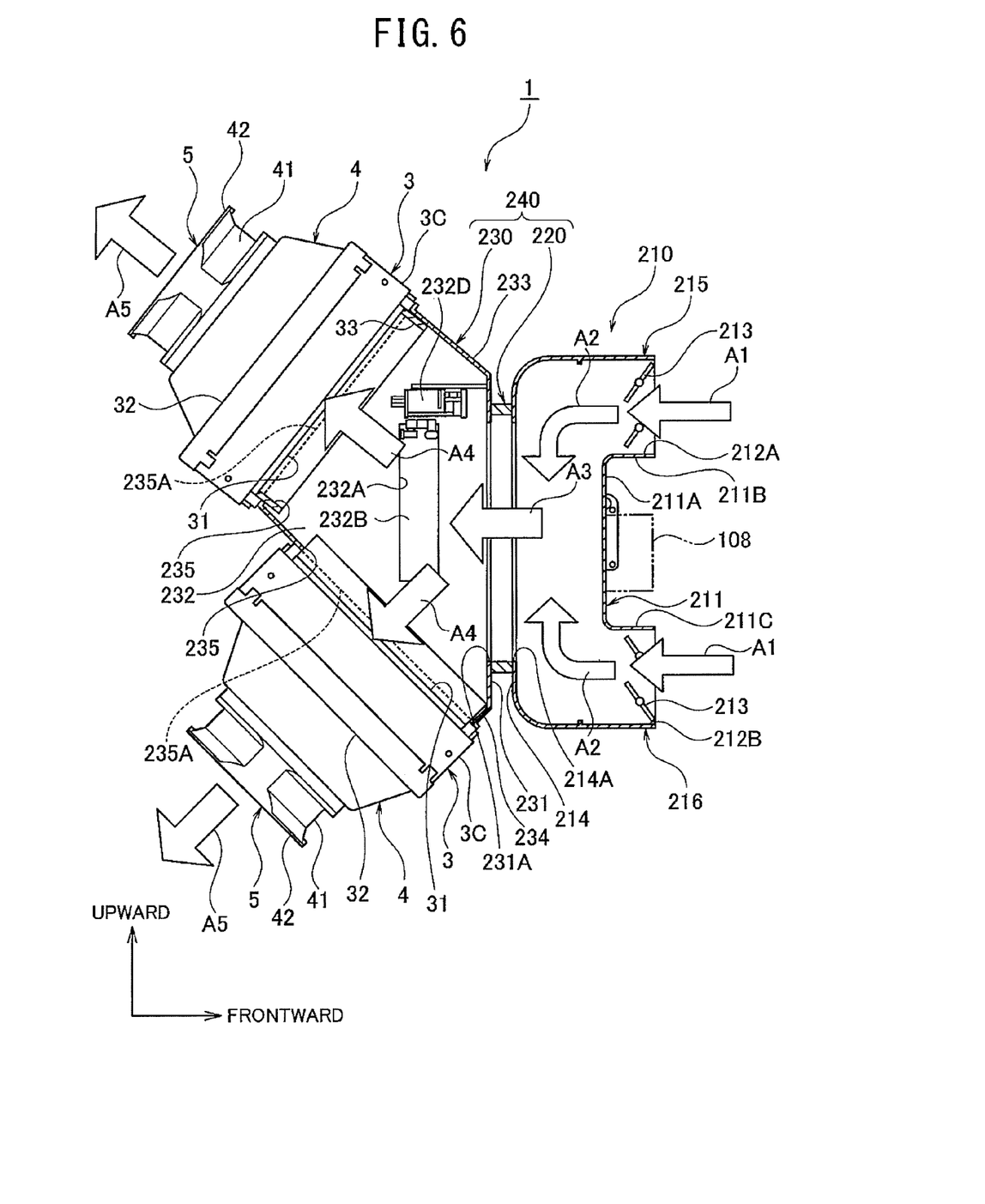
FIG. 6 is a sectional view along line VI-VI of FIG. 5.

As shown in FIG. 6, the upstream duct portion 210 has a rear side panel 214 facing the front side panel 211. The rear side panel 214 is formed with a rectangular opening 214A vehicle-vertically extending beyond both of a height level that the upper edge part 211B of the front side panel 211 has and a height level that the lower edge part 211C of the front side panel 211 has. As shown in FIG. 4 and FIG. 6, the downstream first duct part 220 is made up as a rectangular short tubular member close attached and fixed at an upstream end thereof to the rear side panel 214, along a circumference of the rectangular opening 214A, affording for internal air communication with the upstream duct portion 210 through the opening 214A of the rear side panel 214. As shown in FIG. 4, the downstream first duct part 220 has a rectangular planer filter 221 provided for the interior to be filled therewith.

As shown in FIG. 4, the downstream second duct part 230 is made up as a box-like member formed in a hollow prism shape with a substantially trapezoidal cross section. As shown in FIG. 6, the downstream second duct part 230 has a front side panel 231 arranged at a vehicle-longitudinally front side thereof opposite to the rear side panel 214 of the upstream duct portion 210. The front side panel 231 is formed with a rectangular upstream opening 231A in an identical size to the rectangular opening 214A of the rear side panel 214. To the front side panel 231, the downstream first duct part 220 is close attached and fixed at a downstream end thereof, along a circumference of the upstream opening 231A, thereby affording for internal air communication through the opening 231A between the first duct part 220 and the second duct part 230 of the downstream duct portion 240. As shown in FIG. 6, the front side panel 231 is provided at an upper corner thereof with an upper panel piece 233 upwardly diagonally extending therefrom, covering an upside region of the second duct part 230, and at a lower corner thereof with a lower panel piece 234 downwardly diagonally extending therefrom, covering a downside region of the second duct part 230.

As shown in FIG. 6, the second duct part 230 of the downstream duct portion 240 has, in the side elevation, a pair of aperture areas 235A constituting upper and lower oblique sides intersecting each other at a vehicle-longitudinally rear end corner thereof. More specifically, the downstream second duct part 230 includes a pair of rectangular downstream openings 235 substantially plane-symmetrically arranged with respect to a vehicle-longitudinal reference plane, whereby aperture areas 235A of the paired openings 235 have their extension planes crossing each other at right angles. At the downstream second duct part 230 seen in the side elevation, one downstream opening 235 has a normal line constituting a center axis thereof upwardly diagonally rearward oriented relative to the vehicle-longitudinal reference plane. At the downstream second duct part 230 seen in the side elevation, the other downstream opening 235 has a normal line constituting a center axis thereof downwardly diagonally rearward oriented relative to the vehicle-longitudinal reference plane.

Figure 5:
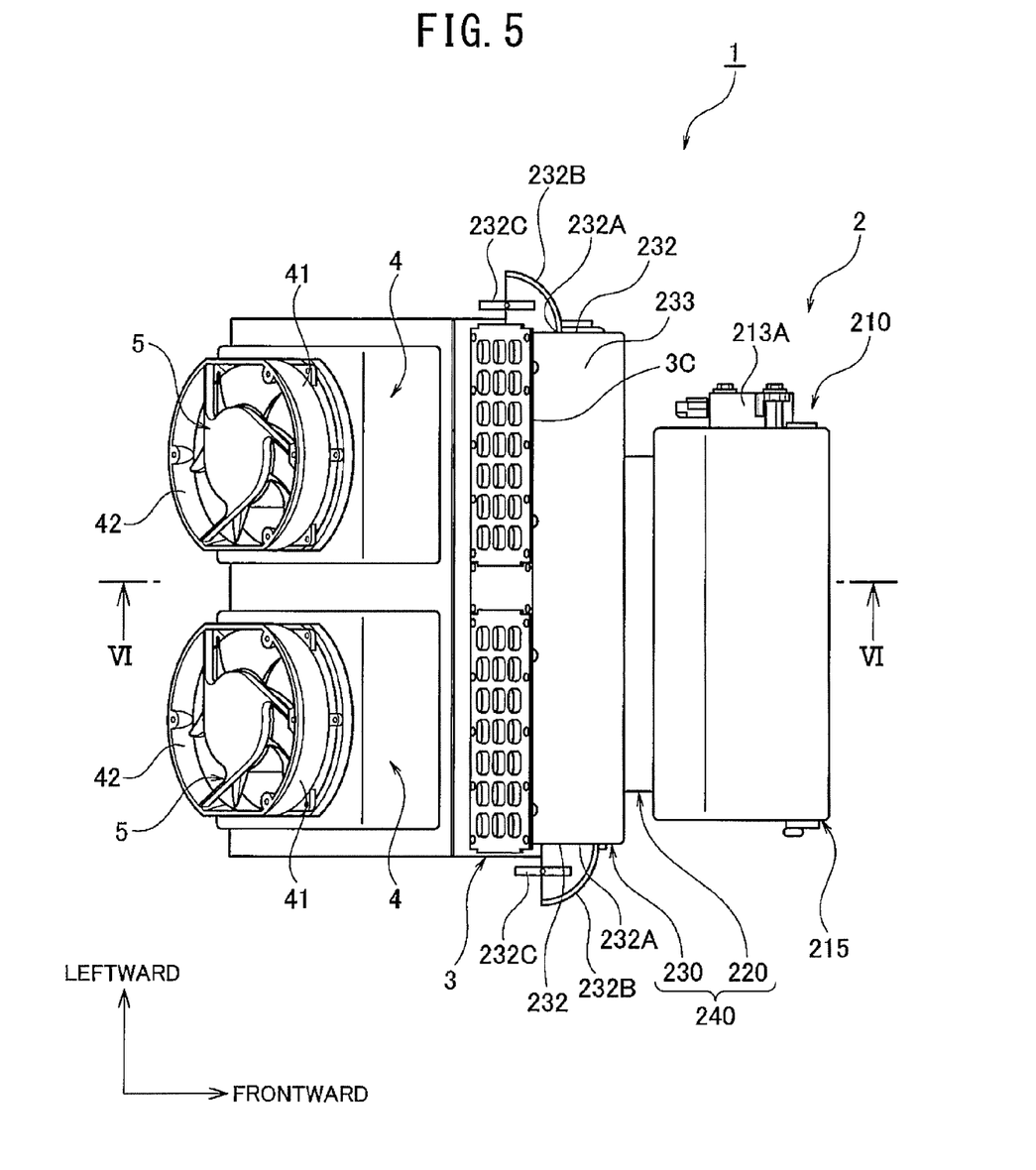
FIG. 5 is a plan view of the fuel cell apparatus.

As shown in FIG. 4, FIG. 5, and FIG. 6, the downstream second duct part 230 has a pair of vehicle-vertically extending lateral side panels 232 arranged at vehicle-transversely opposite two sides thereof. Each lateral side panel 232 is formed with a vehicle-vertically elongate lateral air intake port 232A. As shown in FIG. 3 and FIG. 5, the lateral air intake port 232A is covered from outside with a hood member 232B opening rearward to take in air from vehicle-longitudinally rear side. That is, the lateral air intake port 232A is implemented by provision of the hood member 232B to open substantially in the vehicle-longitudinally rearward direction. Moreover, the hood member 232B has a movable flap 232C accommodated therein for use to open and close the lateral air intake port 232A.

The movable flap 232C is driven by a flap driver 232D shown in FIG. 6, to perform open-close operations. The flap driver 232D is installed on the interior wall of an associated lateral side panel 232. The movable flap 232C is adapted to open when the outside air temperature is lower than a prescribed temperature, that is, a lower limit temperature of a temperature range affording the fuel cell stacks 3 to work as necessary. It is noted that this embodiment employs a pair of individually controllable flap drivers 232D installed on a pair of lateral side panels 232, for driving a pair of movable flaps 232C provided at a pair of second air intake ports 232A. Instead, there may be employed a common flap driver 232D installed on either lateral side panel 232, to drive the pair of movable flaps 232C.

(Fuel Cell Stacks)

The fuel cell stacks 3 have a configuration including stacked (i.e. multi-layered) fuel cells. Each fuel cell includes an electrolyte film, a fuel (hydrogen) electrode, an air (oxygen) electrode, and a separator. More specifically, the fuel cell stacks 3 are each made as a combination of a set of one or more unit stacks, and a stack casing 3C (refer to FIG. 3, FIG. 4, FIG. 5, and FIG. 6) constituting an outer cover of the unit stack set. Each unit stack is composed of multi-layered fuel cells, and a fuel cell enclosure integrally enclosing the fuel cells. At each unit stack, the fuel cell enclosure has an air introducing aperture for introducing air to internal air supply channels, an air out-leading aperture for leading out unused air from air discharge channels communicating with the air supply channels, a fuel gas channel connecting part for introducing fuel gas being hydrogen gas to internal fuel gas channels, and a purge gas channel connecting part for leading out a purge gas containing hydrogen gas from purge gas channels communicating with the fuel gas channels.

As shown in FIG. 3 and FIG. 4, at each fuel cell stack 3, the stack casing 3C has a vehicle-transversely elongate rectangular parallelepiped shape in the contour. As shown in FIG. 6, at each fuel cell stack 3, the stack casing 3C has an air in-taking aperture area 31 constituting the front one of vehicle-longitudinally opposing mutually parallel two sides of the rectangular parallelepiped shape, and an air discharging aperture area 32 constituting the rear one of those two sides. Each fuel cell stack 3 takes in air through the air in-taking aperture area 31 of the stack casing 3C, to use as a reaction gas and a coolant in each unit stack.

As shown in FIG. 4 and FIG. 6, at each fuel cell stack 3, the stack casing 3C has short rectangular duct-shaped filter holders 33 arrayed in a pair in front of the air in-taking aperture area 31. As shown in FIG. 4, each filter holder 33 has a rectangular planer filter 34 accommodated therein. As shown in FIG. 6, at each fuel cell stack 3, the stack casing 3C is connected at the end of the air in-taking aperture area 31 to an associated downstream opening 235 of the downstream second duct part 230, so that their interior spaces communicate with each other.

(Air Discharge Ducts)

As shown in FIG. 2 through FIG. 5, each fuel cell stack 3 has, at a rear side thereof, a pair of vehicle-transversely mutually neighboring air discharge ducts 4 mounted thereon. As shown in FIG. 3 and FIG. 4, each air discharge duct 4 is made up as a tubular member with a rectangular truncated conical outline including an open bottom side constituting an upstream end of the duct 4, and a diameter-reduced top side constituting a downstream end of the duct 4. As shown in FIG. 6, at each fuel cell stack 3, the stack casing 3C is connected at the downstream end, i.e., at the end of the air discharging aperture area 32 to upstream ends of associated air discharge ducts 4, permitting internal air communication in between. At each air discharge duct 4, the downstream end is directionally extended by provision of a circular tubular fan cover 41, so that as best shown in FIG. 5 the fan cover 41 serves at a downstream end thereof to constitute a substantive air discharge port of the air discharge duct 4. There is an air discharge fan 5 installed inside the fan cover 41.

The fuel cell apparatus 1 according to this embodiment thus has a configuration including at least one fuel cell stack 3 made up to take in air as a reaction gas and a coolant through an air in-taking aperture area 31 to an inside thereof and discharge air through an air discharging aperture area 32 to an outside thereof, and arranged in a vehicle-transverse juxtaposition with the radiator 107 in the engine room 104 vehicle-longitudinally rearward of the front member 108, and an air suction duct 2 made up to introduce air to the air in-taking aperture area 31 of the fuel cell stack 3, the air suction duct 2 vehicle-longitudinally extending between the air in-taking aperture area 31 and the front member 108, having a set of one or more air in-taking ports 212A and 212B of the air suction duct 2 vehicle-longitudinally frontward of the radiator 107 and opened toward the set of one or more grill openings 110 and 111.

Figure 7:
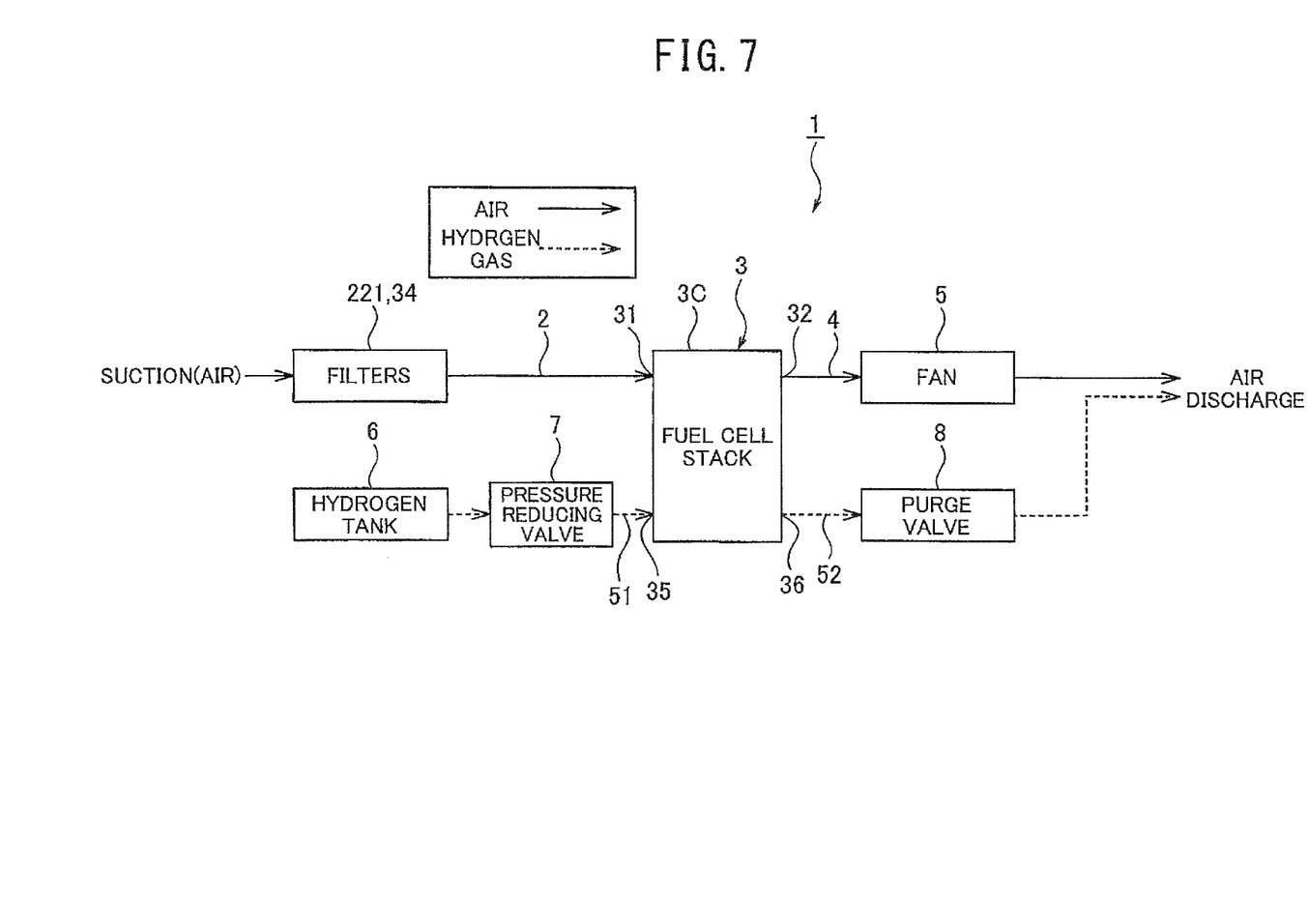
FIG. 7 is a block diagram of a fluid line system in the fuel cell apparatus.

In the fuel cell apparatus 1 according to this embodiment, at each fuel cell stack 3, as shown in FIG. 7, air is let through the air in-taking aperture area 31 into the stack casing 3C, where incoming air is introduced into each unit stack. At each unit stack, introduced air from an air introducing aperture of the fuel cell enclosure is conducted along internal air supply channels, concurrently working to cool associated regions in the unit stack, thus being heated, and distributed to air electrodes of fuel cells in the unit stack, where it is used for reactions to generate electricity. Unused air flows along air discharge channels communicating with the air supply channels, and is lead out of the unit stack through an air out-leading aperture of the fuel cell enclosure, to be discharged as temperature-raised air through the air discharging aperture area 32 of the stack casing 3C, out of the fuel cell stack 3.

In the fuel cell apparatus 1 according to this embodiment, at each fuel cell stack 3, as shown in FIG. 7, the stack casing 3C has a fuel gas line connecting part 35 connected to a downstream end of a fuel gas line 51. The fuel gas line connecting part 35 is supplied with fuel gas, which is introduced to each unit stack. At each unit stack, fuel gas is introduced through a fuel gas channel connecting part of the fuel cell enclosure, conducted along internal fuel gas channels, and distributed to fuel electrodes of fuel cells in the unit stack, where it is consumed for reactions to generate electricity. Since these reactions produce by-product moisture, fuel gas channels are purged, as needed. Then, a mixture of fuel gas (hydrogen gas), moisture, or such is flushed as a purge gas along purge gas channels communicating with the fuel gas channels, and lead through a purge gas channel connecting part of the fuel cell enclosure, out of the unit stack, to discharge through a purge gas line connecting part 36 of the stack casing 3C, out of the fuel cell stack 3, into an associated purge gas line 52.

(Fluid Line System)

In the fuel cell apparatus 1, as shown in FIG. 7, at each fuel cell stack 3, incoming outside air is introduced through the air suction duct 2 to the air in-taking aperture area 31 of the stack casing 3C, and outgoing air is discharged from the air discharging aperture area 32 of the stack casing 3C to associated air discharge ducts 4. The air suction duct 2 has the filter 221 and filters 34, where outside air is cleaned. Each air discharge duct 4 has an air discharge fan 5, which is operable to produce negative pressures prevailing up to the air suction duct 2, where they act as suction pressures. Further at this fuel cell stack 3, fuel gas is supplied from a high-pressure hydrogen tank 6 through an associated fuel gas line 51 to the fuel gas line connecting part 35 of the stack casing 3C. In the hydrogen tank 6, compressed hydrogen gas is stored. The fuel gas line 51 has a pressure-reducing valve 7, where fuel gas is pressure-reduced. When the fuel cell stack 3 is purged with a purge valve 8 opened at an associated purge gas line 52, a purge gas is discharged from the purge gas line connecting part 36 of the stack casing 3C to the purge gas line 52. Purge gases in such purge gas lines 52 are collected at a diluter, where they are mixed with air introduced from a specific air discharge duct 4, thereby being diluted well below a lower limit of an inflammable hydrogen concentration range, to release outside the vehicle.

(Operations and Effects of Fuel Cell Apparatus)

Description is now made of operations and effects of the fuel cell apparatus 1 according to this embodiment. In the fuel cell apparatus 1, as shown in FIG. 1 and FIG. 2, the paired fuel cell stacks 3 are arranged to discharge temperature-raised air through their air discharge ducts 4 inside the engine room 104, so that streams of discharged air flow vehicle-longitudinally upwardly diagonally rearward and downwardly diagonally rearward in the engine room 104, effectively warming the engine room 104.

The flap drivers 232D are operable for driving the movable flaps 232C to close the lateral air intake ports 232A, in situations in which the outside air temperature resides in an adequate range of temperatures for the fuel cell stacks 3 to operate as needed, that is, when it is higher than a lower limit temperature of the temperature range. If the lateral air intake ports 232A are closed, the air suction duct 2 gets free from intrusion of warm air having come around from the air discharge ports 42. In this condition, the upper air intake port 212A and the lower air intake port 212B are both kept open. It is noted that the hood members 232B of the lateral air intake ports 232A are vehicle-longitudinally rearward open, whereby air streams about the air suction duct 2 inherently have reduced tendencies to strike into them, when the vehicle is running.

FIG. 6 shows the fuel cell apparatus 1 with the air suction duct 2 under the condition that the lateral air intake ports 232A are closed, and the upper air intake port 212A and the lower air intake port 212B are open. Under this condition, the fuel cell apparatus 1 undergoes effects of suction pressures by operation of air discharge fans 5 as well as wind pressures when the vehicle is running, whereby outside air flows along streamlines represented by arrows A1, through the upper air intake port 212A and the lower air intake port 212B, into the upstream duct portion 210, and runs along streamlines represented by arrows A2 in the upstream duct portion 210, joining together to pass through the filter 221 in the downstream first duct part 220 along streamlines represented by an arrow A3, striking into the downstream second duct part 230. At the downstream second duct part 230, incoming air streams are branched and led along streamlines represented by arrows A4 to the paired downstream openings 235, to introduce therefrom to the fuel cell stacks 3. At each fuel cell stack 3, introduced air streams are distributed, used, and collected, while cooling the stack inside, thus being heated. Thus warmed air is lead out to associated air discharge ducts 4, and discharged at their air discharge ports 42 along streamlines represented by arrows A5, for instance.

According to this embodiment, the fuel cell apparatus 1 includes an air suction duct 2 extending substantially along a vehicle-longitudinal direction from an air in-taking aperture area 31 to a front member 108, that is, vehicle-longitudinally extending between the air in-taking aperture area 31 and the front member 108, having an upstream air in-taking port set including an upper air intake port 212A and a lower air intake port 212B of the air suction duct 2 vehicle-longitudinally frontward of a radiator 107, and opened toward a grill opening set including a set of upper grill openings 110 and a set of lower grill openings 111. Accordingly, streams of air (warm air) having passed the radiator 107, thus having been warmed, have reduced tendency to come around toward the upper air intake port 212A and the lower air intake port 212B of the air suction duct 2. Such being the case, the fuel cell apparatus 1 can avoid having warm air invading the air suction duct 2, as it has passed the radiator 107. Moreover, the fuel cell apparatus 1 affords to feed the air suction duct 2 with significant proportions of natural ventilation air streams in an efficient manner. The fuel cell apparatus 1 is thus adapted to efficiently cool each fuel cell stack 3, allowing for an enhanced performance of the fuel cell stack 3.

According to this embodiment, the fuel cell apparatus 1 has a structure including, as subsets of the grill opening set, the set of upper grill openings 110 being disposed vehicle-vertically upward of the front member 108, and the set of lower grill openings 111 being disposed vehicle-vertically downward of the front member 108. Accordingly, natural ventilation air streams are kept from colliding with the front member 108 immediately after their invasion to upper grill openings 110 and lower grill openings 111. The fuel cell apparatus 1 thus allows for significant proportions of natural ventilation air streams to flow into the engine room 104.

According to this embodiment, the fuel cell apparatus 1 includes the air suction duct 2 made up as a combination of a downstream duct portion 240 extending from an air in-taking aperture area 31 of a fuel cell stack 3 toward the front member 108, and an upstream duct portion 210 vehicle-vertically bifurcated from a front end of the downstream duct portion 210, thereby avoiding interferences between the front member 108 and bifurcate branch sections of the upstream duct portion 210.

In such the structure, the air suction duct 2 has a combination of an upper air intake port 212A opened opposite to the set of upper grill openings 110 at a vehicle-vertically upper side of the front member 108, and a lower air intake port 212B opened opposite to the set of lower grill openings 111 at a vehicle-vertically lower side of the front member 108.

Then, the upper air intake port 212A of the air suction duct 2 is shaped along a contour of the set of upper grill openings 110, and the lower air intake port 212B of the air suction duct 2 is shaped along a contour of the set of lower grill openings 111.

As a result, the fuel cell apparatus 1 can be free from requirements for upper air intake ports 212A and lower air intake ports 212B to be excessively enlarged to take in air at the back of a front member 108. Therefore, the fuel cell apparatus 1 affords to render the air suction duct 2 compact in size and configuration. Moreover, the fuel cell apparatus 1 affords to have a reduced volume occupied by the air suction duct 2 in the engine room 104, allowing for an enhanced design flexibility of the engine room 104.

According to this embodiment, the fuel cell apparatus 1 has the upper air intake port 212A and the lower air intake port 212B of the air suction duct 2 opening in vicinities of major subsets of the grill opening set, i.e., the upper grill opening set 110 and the lower grill opening set 111. Therefore, the fuel cell apparatus 1 is adapted to have, among natural ventilation air streams running into the engine room 104 through the grill opening set, significant proportions of air streams flowing into the air suction duct 2. In addition, the fuel cell apparatus 1 is adapted to have increased amounts of air streams supplied to a fuel cell stack 3, suppressing the volume occupied by the air suction duct 2. According to this embodiment, the fuel cell apparatus 1 is thus adapted for an efficient cooling of the fuel cell stack 3, allowing for an ensured enhancement of operational performance at the fuel cell stack 3.

According to this embodiment, the fuel cell apparatus 1 has a structure including a set of movable flaps 213 and a set of movable flaps 232C provided at different locations, which afford in situations needing a warm-up, for use of the set of movable flaps 213 to control an inflow of air streams to a fuel cell stack 3, to keep from getting excessive. The fuel cell apparatus 1 is thus adapted to prevent an excessive cooling by air streams at the fuel cell stack 3, allowing for a promoted warm-up of the fuel cell stack 3. According to this embodiment, the fuel cell apparatus 1 is thus allowed to improve an operational performance of the fuel cell stack 3. It is noted that the situations needing a warm-up include a situation in which the fuel cell stack 3 has a temperature within a range below a prescribed temperature (e.g. 0 deg-C or near). If the fuel cell stack 3 has a temperature in this range, the set of movable flaps 213 is closed, the set of movable flaps 232C being open for a warm-up of the fuel cell stack 3. If the fuel cell stack 3 has a temperature exceeding the prescribed temperature, the set of movable flaps 213 is opened for the fuel cell apparatus 1 to enter a normal run. It is noted that in situations needing a warm-up, the movable flaps 232C provided on lateral sides are operable to open, for use to introduce warm air in the engine room 104 into the downstream second duct part 230.

Second Embodiment

Figure 8:
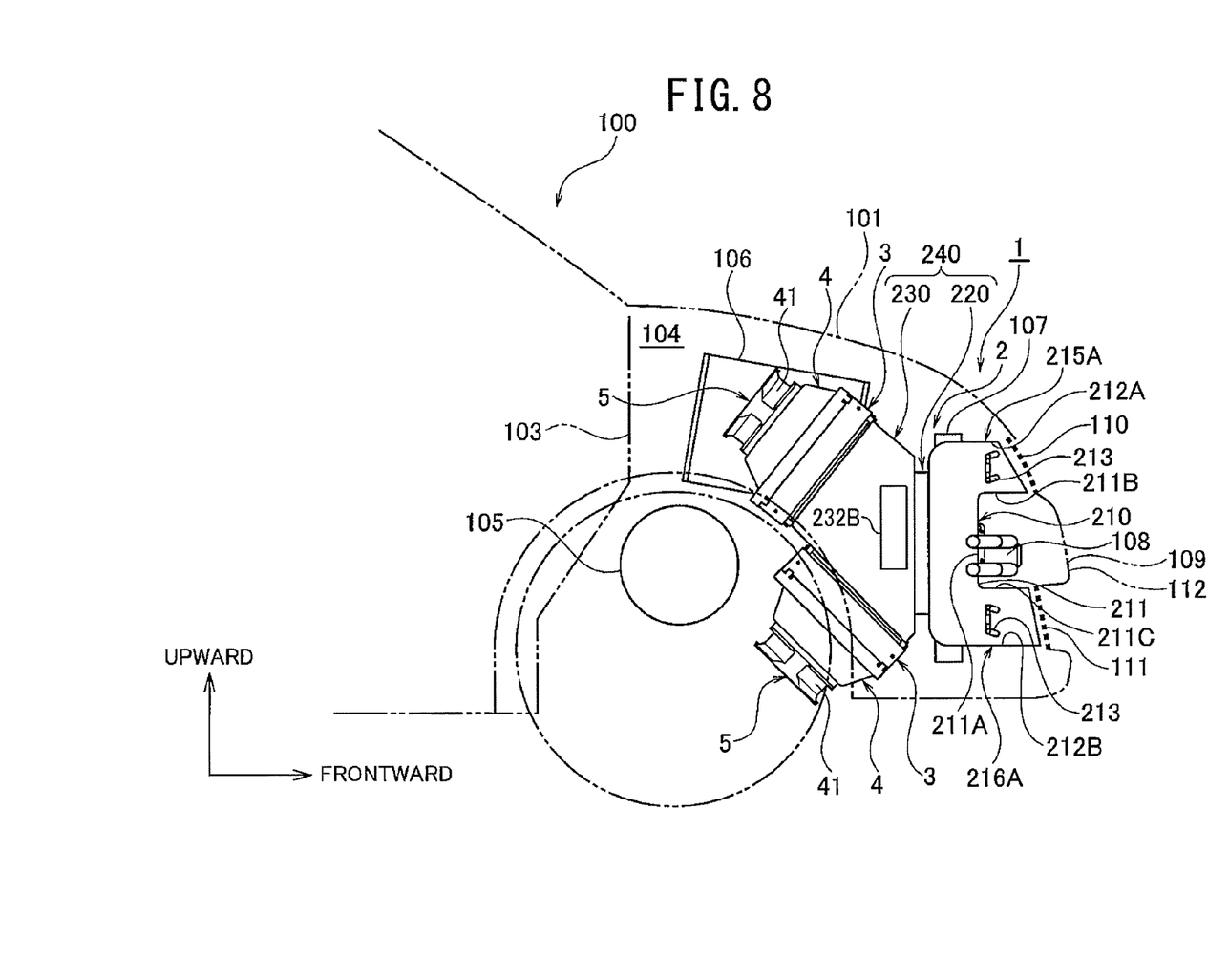
FIG. 8 is a side elevation of a fuel cell apparatus for vehicles according to a second embodiment of the present invention.

FIG. 8 shows, in a side elevation, a fuel cell apparatus 1 according to a second embodiment of the present invention, as it is mounted in a front section of a vehicle 100. Relative to the first embodiment, like constituent elements of the second embodiment are designated by like reference signs in FIG. 8, omitting redundant description. In this embodiment, as shown in FIG. 8, an upper duct portion 210 has an upper air intake section 215A and a lower air intake section 216A thereof brought closer to an upper grill opening set 110 and a lower grill opening set 111 being subsets of a set of grill openings, respectively, such that between an upper air intake port 212A provided at the upper air intake section 215A and a lower air intake port 212B provided at the lower air intake section 216A, at least either (e.g., the lower air intake port 212B in FIG. 8) is protruded to a vehicle-longitudinally front side, i.e., toward the side of the grill opening set, more than a front end of a front member 108 facing an un-grilled or blind central bar zone 112 of a front bumper 109.

According to this embodiment, the fuel cell apparatus 1 affords to have natural ventilation air streams running through the set of upper grill openings 110 and the set of lower grill openings 111 toward an engine room 104, causing at an initial phase of their diffusion to flow into the upper air intake port 212A and the lower air intake port 212B. Therefore, the fuel cell apparatus 1 is adapted to effectively suppress amounts of air streams circumferentially leaking, that is, diffusing before an air suction duct 2, through gaps such as those between the upper grill opening set 110 and the upper air intake port 212A and between the lower grill opening set 111 and the lower air intake port 212B, into spatial regions outside the air suction duct 2 in the engine room 104. Accordingly, the fuel cell apparatus 1 allows for significant proportions of air streams supplied through the air suction duct 2 to fuel cell stacks 3.

Other Embodiments

Embodiments of the present invention have been described, including discussions and drawings constituting part of the disclosure, which should be construed as illustrative, not restrictive to the invention. There may be various substitute embodiments, examples, and application techniques made apparent to artisan by the disclosure.

For instance, embodiments described have a configuration including fans 5 installed downstream of a fuel cell stack 3, which may be substituted by a configuration including a fan 5 installed upstream of the fuel cell stack 3. Moreover, according to embodiments described, a downstream duct portion 240 of an air intake duct 2 has two downstream openings 235, whereas the number of such downstream openings can be varied, as necessary. Further, according to embodiments described, the air intake duct 2 and air discharge ducts 4 have their structures, which are not restrictive to the invention, either.

What is claimed is:
1. A fuel cell apparatus for vehicles including:
 a vehicle-transversely extending front bumper disposed at a vehicular front end;

the front bumper having a grill opening set formed therein to take in air from outside toward an engine room;

a vehicle-transversely extending front member disposed vehicle-longitudinally rearward of the front bumper, in a position vehicle-longitudinally non-overlapping the grill opening set, and close to the front bumper; and a radiator disposed in the engine room, in a position vehicle-longitudinally rearward of the front member, such that air is heated by the radiator in the engine room, the fuel cell apparatus for vehicles comprising:

a fuel cell stack adapted to use air taken in from outside through the grill opening set and air in the engine room heated by the radiator, as a reaction gas and a coolant, wherein the fuel stack is positioned in the engine room vehicle-longitudinally in a position rearward of the front member; and vehicle-transversely in a juxtaposition with the radiator, the fuel cell stack comprising a stack casing having an air in-taking aperture area to take in air to an inside thereof, and an air discharging aperture area to discharge air to an outside thereof; and an air suction duct configured to conduct air taken in from outside through the grill opening set and air in the engine room heated by the radiator, to the air in-taking aperture area, the air suction duct extending vehicle-longitudinally between the front member and the air in-taking aperture area, the air suction duct including an upstream duct portion and a downstream duct portion;

the upstream duct portion of the air suction duct comprising a first air intake port set disposed vehicle-longitudinally frontward of the radiator and opened toward the grill opening set to introduce air taken in from outside through the grill opening set into an inside of the upstream duct portion, a first movable flap set configured to open and close the first air intake port set, and a first flap driver set configured to drive the first movable flap set;

the downstream duct portion of the air suction duct comprising a second air intake port set open to the engine room to introduce air in the engine room heated by the radiator to an inside of the downstream duct portion, a second movable flap set configured to open and close the second air intake port set, and a second flap driver set configured to drive the second movable flap set;

wherein the first flap driver set and the second flap driver set are adapted to provide a first cooperation to open the first air intake port set and close the second air intake port set; and wherein the first flap driver set and the second flap driver set are adapted to provide a second cooperation to close the first air intake port set and open the second air intake port set.

2. The fuel cell apparatus for vehicles according to claim 1, wherein the grill opening set comprises an upper grill opening set disposed vehicle-vertically above the front member, and a lower grill opening set disposed vehicle-vertically below the front member, and wherein:

the downstream duct portion of the air suction duct extends from the air in-taking aperture area of the stack casing toward the front member, the upstream duct portion of the air suction duct is vehicle-vertically bifurcated from a front end of the downstream duct portion, and the first air intake port set comprises an upper air intake port open opposite to the upper grill opening set at a vehicle-vertically upper side of the front member, and a lower air intake port opened opposite to the lower grill opening set at a vehicle-vertically lower side of the front member.

3. The fuel cell apparatus for vehicles according to claim 2, wherein the upper air intake port is shaped along a contour of the upper grill opening set, the lower air intake port is shaped along a contour of the lower grill opening set, and the upper air intake port or the lower air intake port protrudes toward the grill opening set beyond a front end of the front member.

4. The fuel cell apparatus for vehicles according to claim 1, wherein the downstream duct portion of the air suction duct is vehicle-vertically bifurcated at a downstream end thereof, to connect with a stack casing of another fuel cell stack.

5. The fuel cell apparatus for vehicles according to claim 1, wherein the second air intake port set comprises an air intake port covered from outside with a hood member opening vehicle-longitudinally rearwardly.

6. The fuel cell apparatus for vehicles according to claim 1, wherein the downstream duct portion of the air suction duct comprises a first lateral side panel which is vehicle-longitudinally extending at a side of the downstream duct portion facing the radiator, the second air intake port set comprises a first lateral air intake port formed in the first lateral side panel, the second movable flap set comprises a first movable flap configured to open and close the first lateral side port, and the second flap driver set comprises a first flap driver to drive the first movable flap.

7. The fuel cell apparatus for vehicles according to claim 6, wherein the downstream duct portion of the air suction duct comprises a second lateral side panel vehicle-longitudinally extending at a side of the downstream duct portion hidden from the radiator, the second air intake port set comprises a second lateral air intake port formed in the second lateral side panel, the second movable flap set comprises a second movable flap configured to open and close the second lateral side port, and the second flap driver set comprises a second flap driver to drive the second movable flap.

8. The fuel cell apparatus for vehicles according to claim 1, wherein the first flap driver set and the second flap driver set are adapted to provide the first cooperation when the fuel cell stack requires lower temperatures of air, and to provide the second cooperation when the fuel cell stack requires higher temperatures of air.

* * * * *